United States Patent [19]

Kautz et al.

[11] 3,934,052

[45] Jan. 20, 1976

[54] METHOD FOR MANUFACTURING PASTRY

[75] Inventors: Kurt Kautz, Dahlenburg; Otto Daetz, Bleckede, both of Germany

[73] Assignee: Molkereigenossenschaft Dahlenburg eGmbH, Germany

[22] Filed: June 6, 1974

[21] Appl. No.: 476,945

Related U.S. Application Data

[63] Continuation-in-part of Ser. No. 397,361, Sept. 14, 1973, abandoned, which is a continuation of Ser. No. 264,715, June 21, 1972, abandoned.

[30] Foreign Application Priority Data

July 17, 1971 Germany............................ 2135842

[52] U.S. Cl................................. 426/659; 426/296
[51] Int. Cl.²............................................ A23G 3/00
[58] Field of Search ........... 426/162, 152, 363, 343, 426/201, 226, 659, 296

[56] References Cited

UNITED STATES PATENTS

| | | | |
|---|---|---|---|
| 3,198,637 | 8/1965 | Harris et al. | 426/162 |
| 3,343,965 | 9/1967 | Gass | 426/162 |

FOREIGN PATENTS OR APPLICATIONS

| | | | |
|---|---|---|---|
| 715,019 | 8/1965 | Canada | 426/162 |

*Primary Examiner*—Raymond N. Jones
*Attorney, Agent, or Firm*—Toren, McGeady and Stanger

[57] ABSTRACT

A method for manufacturing a pastry composition is disclosed wherein sugar and fat are mixed with water, the mixture is boiled for a period of time sufficient to remove most of the moisture but to avoid charring or burning and then the boiled mixture is dried to produce a pastry composition which may be directly baked without the addition of any liquid.

9 Claims, No Drawings

3,934,052

METHOD FOR MANUFACTURING PASTRY

CROSS REFERENCES TO RELATED APPLICATIONS

This application is a continuation-in-part of copending application Ser. No. 397,361, filed on Sept. 14, 1973, which is, in turn, a continuation of application Ser. No. 264,715, filed on June 21, 1972, both now abandoned, the contents of each of said prior application being incorporated herein by reference.

BACKGROUND OF THE INVENTION

1. Field of the Invention

This invention relates to the field of pastry production. More particularly, the present invention relates to a method for producing a novel baking composition for pastries and the like.

2. Description of the Prior Art

Pastries or cakes of the kind known as florentines, macaroons, crunchies, almond slices, almond sweetmeats, nutty crackers, cream rolls and the like, as well as special German type of pastry called "Bienenstich" consisting essentially of a base of yeast dough with a coating or surface of sugar, fat, almond and nuts are well known. In all of these types of pastries or cakes, substantially the same basic mass is used and only the extra ingredients are varied. Such pastries or cakes are produced, for example, by forming a past made of sugar and/or sugar materials, such as, honey, fat and milk product, and this paste is then boiled. This compound is filled as intermediate product into containers and must have liquid added thereto prior to baking by heating. At this time, ground additives, such as almonds, coconut flakes, nuts and/or fruit are added to the batter. This batter may then be spread on baking tins and baked.

The term "fat" used in this specification comprises any edible animal or vegetable fat, butter or oil. The milk product used may be cream or condensed skimmed milk.

The method described above is used, for example, for making florentine cakes. For the manufacture of so-called Bienenstich, the compound is spread over a base of leavened dough. With the known processes this is rather difficult because only small amounts may be applied, on the one hand, to prevent the dough from burning, and on the other hand, to prevent the mass from running off the dough. Furthermore, when the hot mass is spread, fermentation bubbles may form due to the thermal shock. Moreover, the mass penetrates through channels and pores in the rolled dough on to the tin, preventing the pastry from being properly formed. For this reason, baked pastry of this type is difficult to cut and problems arise when a cream filling is to be used.

The known methods also have further disadvantages. The material must be heated prior to use in order to admix the ingredients, and this presents an additional step. Furthermore, the material is sticky and viscous and cannot be easily removed from its container, consequently, accurate measuring is difficult. During application by hand, the hand must be kept continuously wet by dipping it in water, and during the baking, the adhering water gives rise to undesirable bubbles. When the material is too moist, for example, for making florentine cakes, the mass tends to burn in the tins or to run and the resulting pastry is unattractive.

For the manufacture of florentine cakes it is also known to spread nut and/or almond kernel shavings on a belt of siliconised paper and to form a flat base by vibration, whereupon a preheated and liquified mixture (batter) of the kind mentioned above is sprayed on. This results in non-uniform mixing, whilst the jet may cause the kernel shavings or crushed kernels to be dislodged and an unfavourable layering to be produced.

SUMMARY OF THE INVENTION

The invention relates to the manufacture of the above mentioned and similar pastries and cakes, as well as the manufacture of coatings for such cakes by means of a new product.

The invention has not only the object of improving the manufacturing method for making pastries, cakes and coatings by reducing the amount of work to be performed by the baker, but also of providing a method whereby pastries and cakes of better quality can be produced more economically, whilst the application of the material is expanded, so that new products can be made.

More particularly, the present invention comprises a method for manufacturing a pastry composition to be used in baking wherein sugar and fat in a ratio in the range from about 2.5:1 to 3.5:1 are mixed with water in an amount from about 10 to 25 percent by weight of the total mixture, and the mixture is then boiled at about atmospheric pressure for a period of time sufficient to remove most of the moisture. However, the boiling is carried out in such manner and for such a period of time to allow sufficient moisture to remain at the end of boiling to avoid charring or buring of the remaining components. The mixture is then dried to a residual moisture content of from about 1 to 2.5 percent by weight based on the total weight of the final mixture under conditions whereby charring does not occur. The dried mixture is then powdered to produce the final product.

The product obtained with the present invention possesses the unique property of being capable of being baked without the necessity of adding any additional liquid. That is to say, it is unnecessary to form the final powdered product obtained by the foregoing process into a batter or to add water, milk, or any other type of liquid conventionally used in baking thereto.

The powdered product obtained by virtue of the present process can be used in and of itself, or can be mixed with conventionally known additives, i.e., nuts, coconut flakes, fruit, etc., to produce various types of pastry products.

It is further possible to add the powdered product obtained by the present process to a conventional cookie-type base, i.e., by spreading it on top, to produce an additional crunchy layer or coating in the final cookie or pastry.

In this way, the baker is provided with a powdered product which can be mixed, at his discretion, with conventional ingredients, and can be spread easily, without the addition of an additional liquid. It may be spread either on a baking tin or a base mixture or other edible type pastry base. That is to say, it can be used alone or in combination with conventional pastry bases. The application of the powder may be accurately metered and the metered amount may be easily spread over a leavened dough. The flowing properties of the powder make possible the automated application by vibrating devices and the like.

Because of the fact that the powdered products obtained by the process need not be formed into a paste or batter and need not be heated in order to make it applicable to formation into a pastry, substantial savings can be effected in the baking process.

DESCRIPTION OF THE PREFERRED EMBODIMENT

As noted above, the types of fat which may be used are those which are conventionally used in edible pastry products. Thus, there is nothing particularly critical with respect to the type of fat, although butterfat, e.g., in the form of butter, cream, etc., is a preferred form.

Insofar as the sugar is concerned, this may be present as glucose, common refined sugar, honey, and mixtures thereof. Here again, the type of sugar present may be any of those types conventionally used in baking processes.

Numerous other ingredients may be added to the mixture prior to boiling, and, in fact, a small amount of flour may even be used to control the formation of the mixture. However, flour is used only very sparingly in the present composition, if at all. Milk and milk products, e.g. skimmed milk, cream, etc., as conventionally used in baking products may also be added to the present composition. These, however, in no way affect the particular final result which is obtained subsequent to the drying step of the process disclosed above.

The main components, namely, the fat, sugar, and water, are mixed so as to produce a relatively homogeneous mass. It is unnecessary, however, to mix at high speed or with great vigor. The purpose of the mixing is solely to provide some degree of homogeneity in the mixture prior to boiling.

Boiling is effected in the conventional manner by heating, generally at about atmospheric pressure. By about atmospheric pressure, it is intended to mean that there is no necessity, during the boiling step, to specifically exert any vacuum or higher pressure conditions on the mixture. Obviously, the actual boiling point of the mixture will depend on the amount of sugar or other dissolved material in the liquid. Preferably, the boiling temperature of the liquid ranges from 115° to 130°C.

The boiling is carried out such that a moderately vigorous swirling action, due to the churning of the boiling mixture, is obtained. Certainly, it would be undesirable, from a practical point of view, to have excess churning since this would result in splattering and loss of material.

The boiling is continued for a sufficient amount of time to remove a substantial portion of the water from the mixture. It is difficult in a general description to describe exactly how much water should be left. This, however, will be readily apparent to the skilled art worker on following the instruction that boiling should be continued so long as sufficient water is present to avoid charring or burning of the remaining material. Thus, it is important that towards the end of the boiling, i.e. when, from observation, it is apparent that a relatively small amount of water or liquid remains in the mixture, that it be carefully timed such that charring does not take place. Obviously, if any of the contents are burned or charred, it could detract from the taste characteristics of the final product.

Generally, it is preferred that the mixture is boiled for a time period from about 3 to 10 minutes. However, this will differ, depending on the amount of water added initially.

Depending on the proportions of water and sugar, it is preferred that the boiling takes place at a liquid temperature of about 125°C. The maximum temperature of boiling should be no more than about 142°C in order to make certain that charring does not take place.

The boiling step results in the sugar in the composition taking on an amorphous structure. This particular structure is important in obtaining the final properties of the composition.

After boiling, the mixture is dried to a moisture composition in the range from about 1 to 2.5 percent by weight of the final mixture. This drying step is carried out in such a way as to retain the amorphous structure in the sugar produced by the boiling. Thus, the drying is normally carried out at elevated temperatures, but at temperatures which are substantially below those used for boiling. Putting this another way, the drying step is carried out at such a rate and temperature as to drive off any residual moisture but to avoid burning or charring of the mixture.

Preferably, the drying step is carried out under reduced pressure and at a temperature below melting point of the mixture. Preferably, pressures between about 0.1 to 10 torr are used. Such a drying step often results in a small degree of foaming of the sugar. Such foaming is in no way detrimental, and, in fact, is desirable in certain cases since it facilitates the final granulation of the product. During such drying, the temperature of the mass is generally maintained below about 80°C, and the pressure kept at a value lower than the partial pressure of water vapor.

With respect to the composition, it is preferred that butterfat be used, at least partially, as a fatty ingredient. It may be added either in the liquid state or as a cream to the initial mixture.

It is also suitable to use a binding or thickening agent, e.g., lactic albumen or flour. Such thickening agents, e.g., gelling agents or alginates, have the properties of foaming supports in the baked state. Also, crude lecithin paste may be added if desired. Here again, these additives are not critical to the final result obtained with the present process but merely represent conventional additives used in the pastry baking art.

After drying, the product is granulated and is ready for use directly as is.

The following examples illustrate the present invention:

Compositions A, B, and C, containing the ingredients listed below, were prepared and mixed.

A.
2170 g of beet sugar
1925 g of 80 per cent glucose and/or honey
1000 g of vegetable fat, 100 per cent, or butter
650 g of cream with 30 per cent fat content.

B.
2170 g of beet sugar
1925 g of 80 per cent glucose and/or honey
1000 g of vegetable fat, 100 per cent, or butter
650 g of cream with 30 per cent fat content
25 g of crude lecithin paste.

C.
3000 g of sugar 2000 g of 80 per cent glucose and/or honey 2000 g of fat 800 g of evaporated skimmed milk with 40 per cent solids 500 g of water 500 g of flour 25 g of cruded lecithin paste (at choice).

In the foregoing compositions, 20 per cent of the glucose and 36 per cent of the cream as added are water, totalling, in the case of example A, 800 grams of water. Based on a total weight of 5,745 grams, this represents a solids to water ratio of about 7:1. Based on the amount of sugar added, the ratio of sugar to water to 4.5:1. In examples B and C, the relationship of the water to the solids and sugar is essentially the same as the composition of A.

For compositions A and B, all of the ingredients, with the exclusion of the crude lecithin paste in composition B, were placed into a boiling pan and boiled at 110°C. This resulted in the intimate combination of the fat, cream, and sugar ingredients. Thereafter, in example B, the crude lecithin paste was added.

For composition C, the sugar was first wetted for glucose and water and boiled at about 120°C. During the boiling, the water in all of the compositions were substantially expelled.

Further in composition C, the evaporated skimmed milk, fat, flour and crude lecithin paste stirred together and heated to about 50°C. The components were then, while in the creamy state, homogenized in a mixer.

The masses obtained from boiling were dried by vacuum dryig. The masses were filled into dishes at a height of about 8 to 10 mm, and dried at a temperature of about 40°C at 0.5 torr. During the drying, the foam reached a height of about 60 to 70 mm in the dry state, and the residual moisture contents of the composition was about 2%. Drying times were about 6.5 hours.

The dried product was then ground in a grinding mill and screened through a sieve with a 2 mm mesh opening. Baking procedures used are those conventional in the art. Generally, the baking temperature is governed by the amount of powder and by the baking time, and may vary within a range of 350° to 120°C. For example, for the preparation mentioned in Example 2, a temperature of about 200–180° for about 14 minutes has proved to give good results. For use as so-called "Bienenstich" a a temperature of 220°C was suitable. At a baking time of 25 minutes, a temperature of 150°C may be used, whilst the lower temperature limit of 120°C requires a baking time to about 45 minutes.

A high temperature, which may be raised in certain applications up to 400°C, is used only for a short duration of the order of a few minutes. Such temperatures are used for making new products which will be described further below.

The mixture of powdered or granulated substance with any additional ingredient is placed on a baking tin for making a pastry or cake, or on a base of dough for making German pastry, and is baked until a product is produced with high surface lustre. In addition, pastries with a duller appearance may be made which belong to some extent amongst the group of biscuits. This dull surface may be produced by adjusting the baking temperatures and duration or by selecting the constituent ratios.

The exact possibility of metering the powder, and its adaptation to bases makes it possible, according to a particular embodiment of the invention, to apply the mixture to an already prepared food, such as meat or fish, and to flame it. In this application, high temperatures are used for short periods, for example, under a grill. It has been shown that foods, such as meat or fish, may be much improved in taste and can be prepared in a novel and tasty manner by means of the powder according to the invention. In addition, foods, such as, souffles, rice pudding, and semolina pudding can be provided with a coating after the manner of a crunchy pastry.

In another application, the mixture is applied to a cake in order to provide a complete cover or to form a partial decorative top. When the mixture is applied to a fruit flan or cake made with fresh fruit, it produces a tasty covering under which the fruit remains in its juicy state, if the top is flamed for only a short time. In the preferred embodiment, the heating is continued until a surface with high lustre is obtained.

In another application of the invention, the mixture of the granulated or powdered mass and at least one ingredient is applied directly to fruit and is baked, making it possible to produce candied fruit in a novel manner. When the mixture is applied to fresh fruit, the coating is produced by short duration flaming at high temperatures. Fruit suitable for this treatment comprises, for example, apples or strawberries, cherries, plums, pineapple and the like. In this connection it should be pointed out that the processing of the mixture according to the invention or of the powder by itself, with a view to producing a crunchy coating, may be performed by the housewife, producing a confectionary with a completely fresh filling. For manufacturing a coating on fruit, it may be recommended to cover the fruit with a meringue-like protein, prior to the application of the powder or mixture. The same method of applying a coating of albumen is used when the coating is to be applied to a substance of the group containing ice cream and meringue. Meringues contain large amount of sugar. Egg white is first whipped up with one third of the amount of sugar and finally fully whipped up after adding the remaining sugar. The ratio between sugar and egg white is 2:1.

The protein compound is preferably made in a layer of milk albumen and egg albumen. For this purpose, conventional, possibly powdered, commercially available preparations may be used and the egg albumen may also be added fresh. It is known to prepare egg albumen commercially by foam, spray or roller drying.

For the substances mentioned above, the application of an albumen prior to the manufacture of the coating offers an expedient solution because ice cream, for example, starts to melt even at a short duration application of heat, whilst the application with fruit introduces additionally a special component of taste.

The invention, therefore, relates also to foodstuffs, fruit or other edible substances of the kind herinbefore mentioned, with a coating made from the powder or mixture according to the invention with at least one additional ingredient. More particularly it relates to an article of food of the group conprising a prepared dough, meat, fish, a baked article, fruit, wherein a layer with high surface lustre, and at least partially accurately adapted to the surface configuration of the article, is applied, the layer containing at least fat, sugar and sugar substances selected from the group comprising glucose and honey, and in which a high degree of surface lustre is produced by baking. It should also be noted that this coating offers a certain amount of protection. During the baking or flaming the temperature is allowed to act until the coating is lustrous in the region of the base compound. The temperature may be selected as a function of time. Where the application of particulate compound or of mixture in the form of a powder is mentioned above, the invention includes the application by spraying in its dry state because this makes it possible to achieve a very accurate dosage. When bases are used with a juicy surface and consequent good adhesion, the base, i.e., the prepared article of food, fruit, or the like, may also be rolled in the powder or mixture.

What is claimed is:

1. A method for manufacturing a composition for baking which comprises mixing sugar and fat, the ratio of sugar to fat being from about 2.5:1 to 3.5:1, with water in an amount from about 10 to 25 per cent by weight of the total mixture, boiling the mixture at about atmospheric pressure for a period of time sufficient to remove most of the moisture while allowing sufficient moisture to remain to avoid charring or burning of the remaining components, drying the boiled mixture to a residual moisture content of from about 1 to 2.5 per cent by weight based on the total weight of the final mixture under conditions whereby charring does not occur, and then powdering the dried mixture, said powdered mixture being capable of being baked without the necessity of adding any additional liquid.

2. The method of claim 1 wherein the mixture is boiled for about 3 to 10 minutes.

3. The method of claim 1 wherein the mixture is boiled at a liquid temperature from about 115 to 130°C.

4. The method of claim 1 wherein the drying step is carried out under reduced pressure.

5. The method of claim 4 wherein the drying step is carried out at a temperature below the melting point of the mixture and a pressure between about 0.1 to 10 torr.

6. The method of claim 1 wherein the initial mixture contains common refined sugar, glucose, and a binding agent, and wherein the ratio of sugar to glucose is in the range from about 70:30 to 50:50, and the amount of binding agent is in the range from about 0.5 to 10 per cent by weight based on the total weight of the mixture.

7. The method of claim 6 wherein the binding agent is selected from the group consisting of lactic albumen or flour.

8. The composition prepared by the process of claim 1.

9. A method for producing a baked product comprising baking the composition of claim 8 without the addition of any liquid thereto.

* * * * *